United States Patent [19]

Prokop

[11] 4,386,684

[45] Jun. 7, 1983

[54] ELECTRIC BRAKE MAGNET

[75] Inventor: B. Robert Prokop, Elkhart, Ind.

[73] Assignee: Kelsey-Hayes Company, Romulus, Mich.

[21] Appl. No.: 372,865

[22] Filed: Apr. 28, 1982

Related U.S. Application Data

[63] Continuation of Ser. No. 173,527, Jul. 30, 1980, abandoned.

[51] Int. Cl.³ .............................................. B60T 7/12
[52] U.S. Cl. .................................. 188/138; 188/163; 192/84 T; 335/281
[58] Field of Search ........... 188/138, 137, 163, 140 R, 188/161, 140 A, 342, 325, 327–330, 331–334, 264 R; 192/84 T, 35, 36, 84 A, 84 PM; 310/76, 77; 335/269, 272, 281, 286, 287, 299

[56] References Cited

U.S. PATENT DOCUMENTS

| | | | |
|---|---|---|---|
| 3,244,259 | 4/1966 | Brede et al. | 188/138 |
| 4,135,607 | 1/1979 | Brown et al. | 188/161 |
| 4,216,849 | 8/1980 | Neill | 188/138 |

Primary Examiner—Douglas C. Butler
Attorney, Agent, or Firm—Ralph J. Skinkiss; Oliver E. Todd

[57] ABSTRACT

An improved electromagnet assembly is disclosed for use in electrically actuated drum brakes. The electromagnet assembly has a cup shaped stamped metal housing. A center pole is mounted in a central opening in the housing which has stepped edges so as to alternately engage the center pole and form arcuate gaps about the center pole. A flux washer is positioned on the center pole to bridge the gaps for increasing the efficiency of the electromagnet. A solenoid winding is positioned within the opening defined by the housing, the flux washer and the center pole and the opening is closed with a friction material.

5 Claims, 5 Drawing Figures

ELECTRIC BRAKE MAGNET

This is a continuation of application Ser. No. 173,527, filed July 30, 1980, now abandoned.

BACKGROUND OF THE INVENTION

This invention relates to an electrically actuated vehicle brake and more particularly to an improved electromagnet construction for such a brake.

In well known types of electrically actuated drum brakes for vehicles, the brake shoes are actuated by pivotal movement of a cammed lever that is supported on a backing plate. The lever carries an electromagnet which, when energized, drags against the rotating brake drum and affects pivotal movement of the lever to actuate the brake shoes. The magnet is mounted for limited movement relative to the lever so as to ride flat on the drum during braking.

Prior art electromagnets for actuating vehicle brakes have been made with cast, machined and stamped housings. In general, the housings are cup shaped and are provided with a center pole to define an annular opening. A solenoid winding is positioned within the annular opening and the opening is closed with a friction material. When an electric current is passed through the solenoid winding, the side of the magnetized housing and the friction material are drawn against the rotating brake drum to pivot the lever which in turn expands the brake shoes into frictional engagement with the brake drum. It has been found that stamped steel housings are ideal for the electromagnets due to the low cost of manufacture relative to cast or machined housings. However, it is necessary to attach a separate center pole to a stamped housing, as distinguished from forming the center pole integrally with the housing. In the past, it has been difficult to attach a separate center pole to a stamped steel housing without either loss of magnetic efficiency or a significant increase in cost.

SUMMARY OF THE INVENTION

According to the present invention, an improved electromagnet construction is provided for electrically actuated vehicle brakes. The electromagnet is provided with a stamped steel housing having a central opening for receiving a center pole. The edge of the central opening is stepped, alternating between inwardly directed portions which engage the center pole and relief areas which are spaced from the center pole. During assembly, the center pole is pressed into the center opening in the housing so as to be tightly confined and held by the inwardly directed edge portions of the center opening. Although the relief areas facilitate pressing the center pole into the housing, they form a gap which interferes with and effectively reduces the magnet flux path between the center pole and the housing. A flat metal washer having an internal diameter corresponding to the external diameter of the center pole is positioned over the center pole to lie against the housing, thereby bridging the gap formed by the relief areas in the center housing opening edge. The washer provides a continuous flux path between the center pole and the outer metallic housing for the electromagnet, thereby increasing the efficiency of the electromagnet to in turn increase the forces applied by the electromagnet through the actuating lever to the brake shoes. After the washer is positioned in the housing, construction of the electromagnet is completed in a conventional manner.

Accordingly, it is an object of the invention to provide an improved construction for an electromagnet for use in electrically actuated vehicle brakes.

Another object of the invention is to provide an electromagnet construction for use in electrically actuated vehicle brakes which permits the use of a relatively low cost stamped metal housing without a loss in efficiency over a one piece housing and center core which otherwise might be encountered.

Other obects and advantages of the invention will become apparent from the following detailed description with reference being made to the accompanying drawings.

DESCRIPTION OF THE PREFERRED EMBODIMENTS

Figure 1:
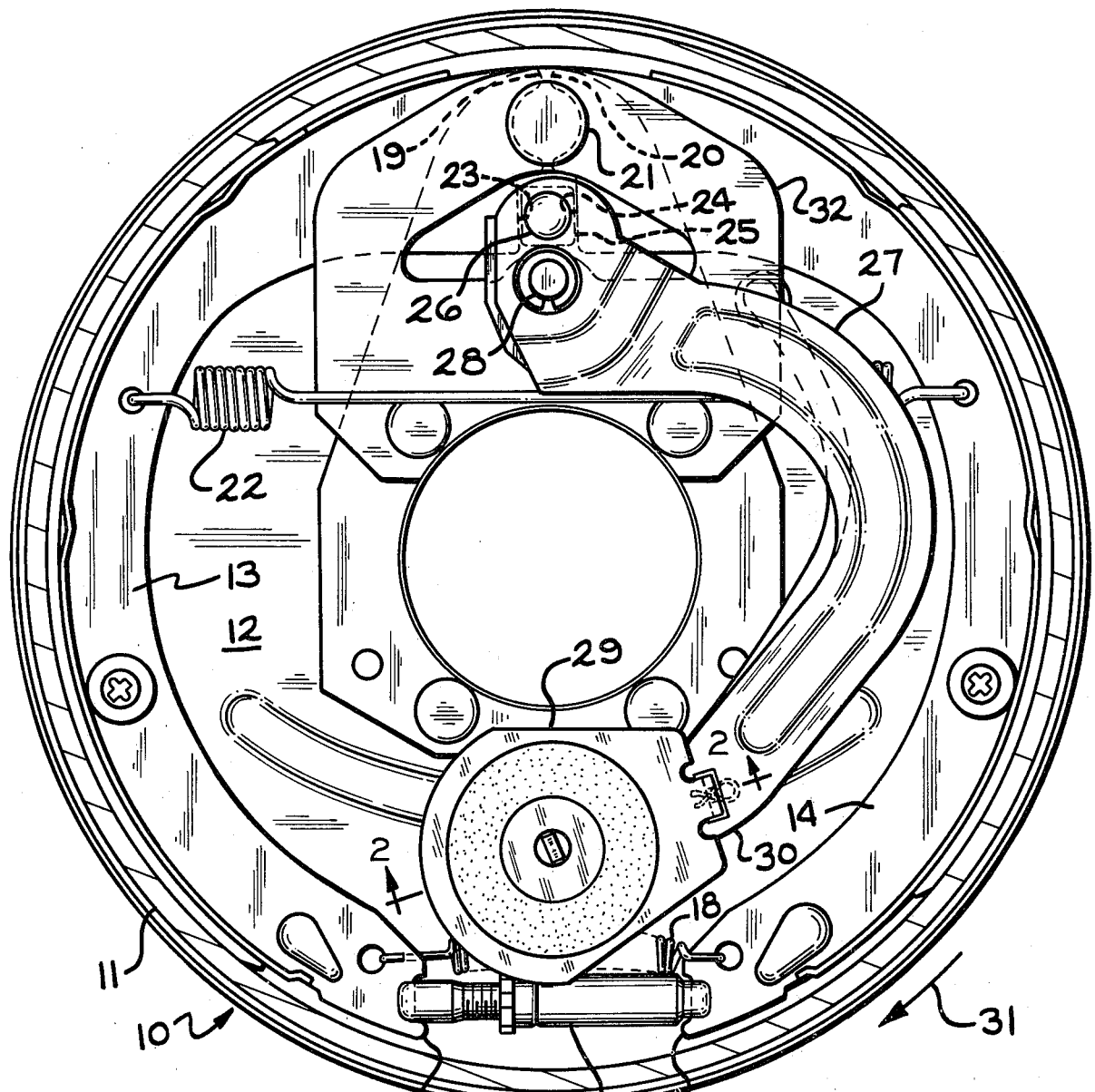
FIG. 1 is a side elevational cross sectional view of an electrically actuated drum brake for a right vehicle wheel embodying this invention.

Turning now the drawings and particularly to FIG. 1, an electrically operated drum brake 10 embodying the present invention is illustrated. The illustrated drum brake 10 is for a right vehicle wheel. A drum brake for a left wheel is a mirror image of the right wheel drum brake 10. The drum brake 10 has been depicted with a brake drum 11 in cross section so as to show in more detail the internal features of the brake 10. The brake 10 includes a backing plate 12 upon which a pair of brake shoes 13 and 14 are supported for relative movement in a conventional manner. An adjusting link 15 is interposed between the lower ends 16 and 17, respectively, of webs of the brake shoes 13 and 14 and these ends 16 and 17 are held in engagement with the adjusting link 15 by means of a tension spring 18. Upper ends 19 and 20, respectively, of webs on the brake shoes 13 and 14 are held in engagement with a post 21 by a retractor spring 22. The post 21 is permanently affixed to the backing plate 12. The webs of the brake shoes 13 and 14 define facing shoulders 23 and 24, respectively, between which a generally square slipper block 25 is positioned. The slipper block 25 is rotatably supported on a pin 26 which projects from a stamped sheet metal actuating lever 27. The actuating lever 27 is, in turn, pivotally supported upon the backing plate 12 by means of a pivot pin 28 which is attached to the backing plate 12.

The actuating lever 27 carries an electromagnet assembly 29 at its lower end 30. The electromagnet assembly 29, when energized, will be brought into frictional engagement with an adjacent surface 37 (FIG. 2) of the rotating brake drum 11, whose normal direction of rotation is indicated by an arrow 31. The engagement between the energized electromagnet assembly 29 and the brake drum 11 will tend to cause the electromagnet assembly 29 to rotate with the brake drum in the direction of the arrow 31. This will affect pivotal movement of the actuating lever 27 in a clockwise direction about the pivot pin 28. As the actuating lever 27 pivots, the slipper block 25 will engage the shoulder 24 of the brake shoe 14 and urge it outwardly into frictional engagement with the associated brake drum 11. This frictional engagement will in turn tend to cause the brake shoe 14 to rotate also with the brake drum and thus exert an actuating force on the brake shoe 13 through the adjusting link 15. This construction of the drum brake 10 is typical of the manner of actuation of such brakes and, therefore, will not be described in further detail.

Figure 2:
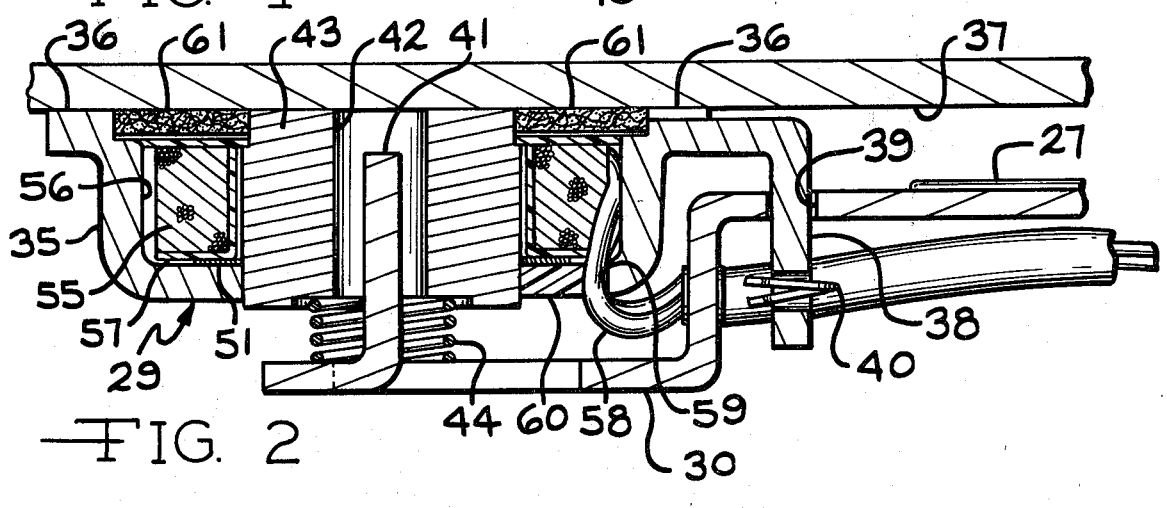
FIG. 2 is an enlarged cross sectional view through the electromagnet of the present invention, as taken along line 2—2 of FIG. 1.

As illustrated in FIGS. 1 and 2, the electromagnet assembly 29 has a metallic housing 35 which is stamped from a ferromagnetic material such as steel. The housing 35 is generally cup shaped and has an outer surface 36 which is positioned adjacent a surface 37 on the brake drum 11. A tab 38 projects from and substantially perpendicular to the surface 36. The tab 38 extends through an opening 39 in the actuating lever end 30 and is retained in such opening 39 by means of a spring clip 40. A tab 41 formed on the actuating lever end 30 extends through a center opening 42 in a center pole 43 in the electromagnet assembly 29. A light compression spring 44 is positioned concentrically over the tab 41 and extends between the actuating lever end 30 and the electromagnet assembly 29. The spring 44 functions to maintain the electromagnet assembly 29 in contact with the brake drum surface 37, even though the brakes are not applied. However, the spring 44 exerts a sufficiently light force on the electromagnet assembly 29 so as not to pivot the actuating lever 27 and move the brake shoes 13 and 14 into contact with brake drum 11. The tabs 38 and 41 and the openings 39 and 42 cooperate to permit the electromagnet assembly 29 to maintain flat contact with the brake drum surface 37, despite variations in manufacturing tolerances and in the flatness of the brake drum surface 37.

Figure 4:
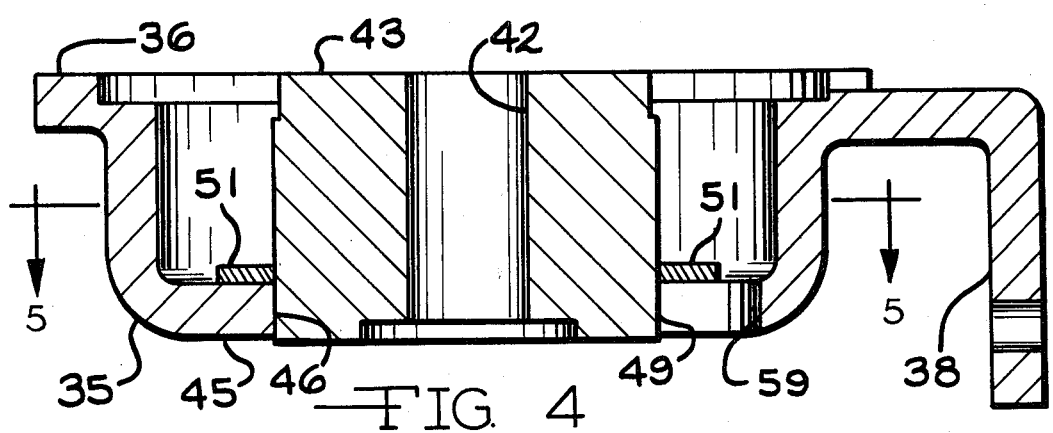
FIG. 4 is an enlarged cross sectional view, similar to FIG. 1, showing the construction of the metallic housing, the attached center pole and the flux washer for an electromagnet constructed in accordance with the present invention.
Figure 3:
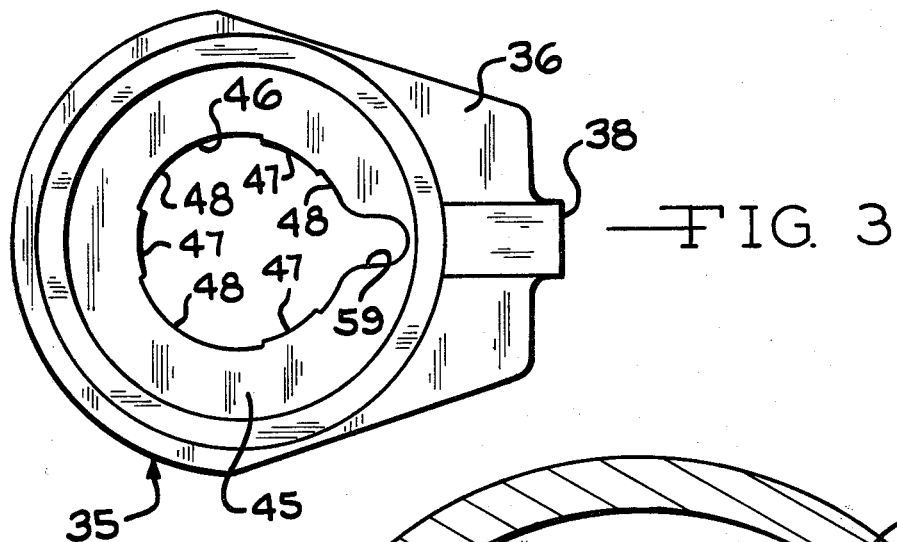
FIG. 3 is an enlarged side elevational view of a stamped housing for an electromagnet constructed in accordance with the present invention.
Figure 5:
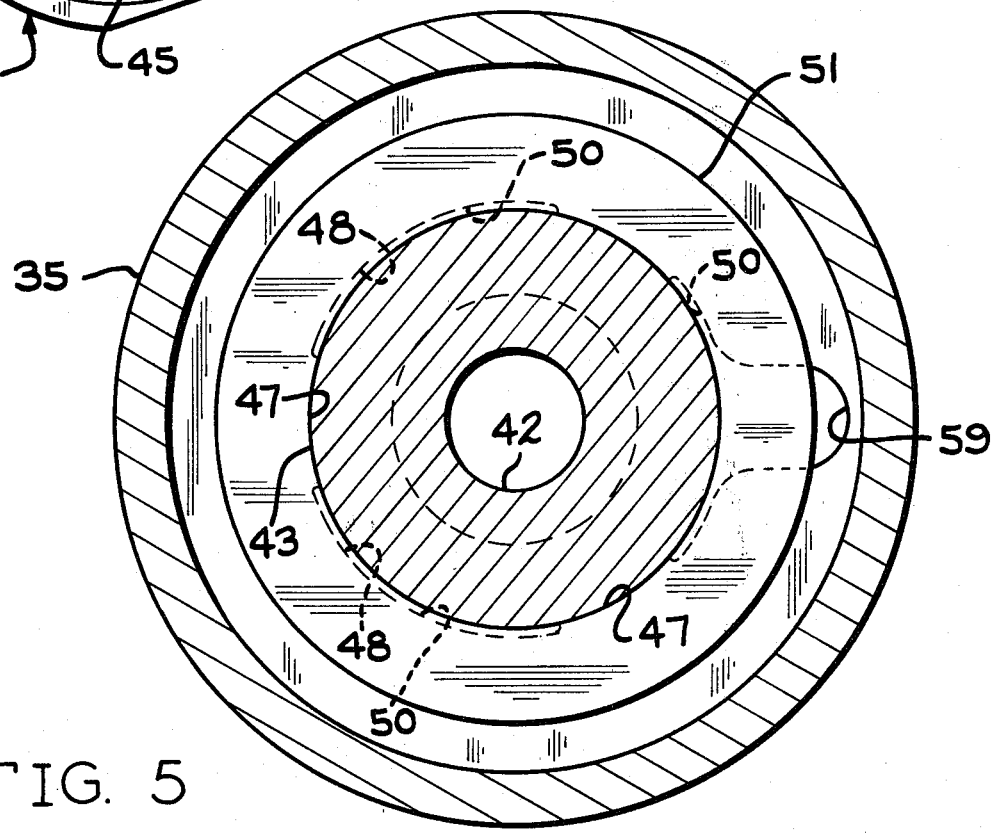
FIG. 5 is an enlarged cross sectional view, partially broken away, taken along line 5—5 of FIG. 4.

Turning now to FIGS. 3-5, details are shown for the construction and assembly of the housing 35 and the center pole 43 for the electromagnet assembly 29. As previously indicated, the stamped metal housing 35 is generally cup shaped. The housing 35 has a bottom 45 which is spaced from and generally parallel to the plane of the outer surface 36. A central opening 46 is formed in the housing bottom 45 for receiving and holding the center pole 43. The opening 46 has a stepped edge which defines inwardly directed portions 47 alternating with relief areas 48. A lower end 49 on the center pole 43 is pressed into the opening 46. The dimensions of the end 49 of the center pole 43 are such as to be firmly engaged and held by the inwardly directed portions 47 around the housing opening 46. If the edges of the housing opening 46 are continuous rather than stepped, it is difficult to manufacture the housing 35 and the center pole 43 of dimensions which permit pressing the center piece 43 into the housing opening 46 while maintaining a sufficient force between the housing 35 and the center pole 43 so as to retain the center pole 43 permanently in place. If the center pole were made larger than a nonstepped housing opening, the center pole could not be inserted into the opening. Or, if the center pole were smaller than the opening, the center pole would not be retained in the opening and, also, the flux path would be interrupted between the housing and the center pole. By manufacturing the relief areas 46 with a larger diameter than the center pole end 49 and the inwardly directed portions 47 with a smaller diameter than the center pole end 49, the center pole 43 may be pressed into the opening 46 and held permanently in place. If additional strength is needed, the center pole end 49 can be welded to the inwardly directed housing portions 49.

When the center pole 43 is attached to the housing 35, the relief areas 48 in the housing opening 46 form arcuate shaped air gaps or slots 50 between portions of the center pole 43 and the housing 35. Unfortunately, the slots 50 interrupt a major portion of the magnetic flux path between the center pole 43 and the housing 35. In accordance with the present invention, a flux washer 51 of a ferromagnetic material, such as steel, is positioned about the center pole 43 to bridge the slots or air gaps 50. The flux washer 51 is flat and has an interior diameter substantially the same as the exterior diameter of the center pole 43 and has an exterior diameter sufficiently large so as to completely bridge over the slots 50 and overlap a portion of the housing bottom 45. As a consequence, the flux washer 51 provides a continuous flux flow path between the center pole 43 and the housing bottom 45 completely about the periphery of the center pole 43. Through the use of the flux washer 51, the efficiency of the electromagnet assembly 29 is greatly increased over a similar electromagnet assembly which omits the flux washer 51. Thus, the flux washer 51 permits the use of an inexpensive stamped steel housing 35 for the electromagnet assembly 29 without loss in efficiency over a more expensive one piece cast or machined metal housing.

Referring again to FIG. 2, the assembly of the electromagnet 29 is shown. After the center pole 43 is attached to the housing 35 and the flux washer 51 is positioned over the slots 50, a solenoid winding 55 is positioned within the annular opening 56 defined by the center pole 43, the flux washer 51 and the housing 35. Although the winding 55 may be wound in situ, it is illustrated as being previously wound on a plastic spool 57 which is shaped to fit into the annular opening 56. Leads 58 from the winding 55 are threaded through an opening 59 in the housing 35. After the leads 58 are threaded through the opening 59, the opening 59 is closed with a suitable sealant 60. A flat annular piece of friction material 61 is positioned to close the annular opening 56 between the housing 35 and the center pole 43. The friction material 61 extends flush with the outer surface 36 on the electromagnet assembly 29 so as to engage the brake drum surface 37 along with the housing surface 36. It will be noted that during the life of the electromagnet assembly 29, the friction material 61 and the outer housing surface 36 and the center pole 43 will simultaneously wear as the electromagnet assembly 29 drags on the rotating brake drum surface 37.

It will be appreciated that various changes and modifications may be made in the above described electrically actuated drum brake 10 without departing from the spirit and the scope of the following claims.

I claim:

1. An improved electromagnet assembly for magnetically engaging a brake drum to move a brake actuator, said electromagnet assembly comprising a stamped ferromagnetic housing having a flat surface for engaging the brake drum and a cup shaped portion extending from said surface, said cup shaped portion having a bottom with a central opening, said central opening having a stepped edge, a center pole mounted in said central opening and extending to the plane of said housing surface, said stepped edge having areas contacting said center pole alternating with gap areas spaced from said center pole, ferromagnetic washer means abutting said housing bottom for bridging said gap areas between said housing and said center pole, said housing, said center pole and said washer defining an opening which is opened at said housing surface, and a solenoid winding located in said annular opening.

2. An improved electromagnet assembly, as set forth in claim 1, wherein said center pole is held in said housing opening by frictionally engaging said edge contacting areas.

3. An improved electromagnet assembly, as set forth in claim 1, wherein said center pole is welded to said edge contacting areas.

4. An improved electromagnet assembly, as set forth in claim 1, wherein said center pole is cylindrical, wherein said gap areas are arcuate in form, and wherein said washer means has a central opening for receiving and closely abutting said center pole and has an exterior diameter greater than the diameter of said arcuate gap areas.

5. An improved electromagnet assembly, as set forth in claims 1 or 4, and further including a friction material extending flush with the plane of said housing surface and closing said opening defined by said housing, said center pole and said washer.

* * * * *